United States Patent
Lee et al.

(10) Patent No.: US 8,354,812 B2
(45) Date of Patent: Jan. 15, 2013

(54) MOTOR

(75) Inventors: Sang Kyu Lee, Gyunggi-do (KR); Dae Lyun Kang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 259 days.

(21) Appl. No.: 12/662,974

(22) Filed: May 13, 2010

(65) Prior Publication Data

US 2011/0127940 A1    Jun. 2, 2011

(30) Foreign Application Priority Data

Nov. 30, 2009   (KR) .................. 10-2009-0116615

(51) Int. Cl.
*H02K 29/08* (2006.01)
(52) U.S. Cl. ......... 318/400.39; 318/400.01; 318/400.37; 318/400.38; 318/700
(58) Field of Classification Search ............ 318/400.39, 318/400.38, 400.37, 400.01, 700
See application file for complete search history.

(56) References Cited

U.S. PATENT DOCUMENTS

| | | | | |
|---|---|---|---|---|
| 4,578,138 A | * | 3/1986 | Hamisch et al. | 156/361 |
| 4,594,524 A | * | 6/1986 | Sudo | 310/68 R |
| 4,644,643 A | * | 2/1987 | Sudo | 29/845 |
| 5,747,908 A | * | 5/1998 | Saneshige et al. | 310/91 |

FOREIGN PATENT DOCUMENTS

| | | |
|---|---|---|
| JP | 2002-191186 | 7/2002 |
| KR | 1998-059156 | 10/1998 |
| KR | 10-0832657 | 5/2008 |

OTHER PUBLICATIONS

Korean Office Action issued Apr. 22, 2011 in corresponding Korean Patent Application 10-2009-0116615.

* cited by examiner

*Primary Examiner* — Walter Benson
*Assistant Examiner* — David Luo

(57) ABSTRACT

There is provided a motor. The motor may include a rotor case including a driving magnet formed on an inner circumferential surface thereof and providing a driving force by interacting with a coil of a stator, a low-speed control magnet formed on an outer circumferential surface of the rotor case and generating a frequency allowing for low-speed rotation enabling label printing as the rotor case rotates at a low speed; and a sensing part sensing an analog signal generated from the low-speed control magnet.

5 Claims, 4 Drawing Sheets

MOTOR

CROSS-REFERENCE TO RELATED APPLICATIONS

This application claims the priority of Korean Patent Application No. 10-2009-0116615 filed on Nov. 30, 2009, in the Korean Intellectual Property Office, the disclosure of which is incorporated herein by reference.

BACKGROUND OF THE INVENTION

1. Field of the Invention

The present invention relates to a motor, and more particularly, to a motor capable of disc labeling by including a low-speed control magnet, generating a pulse for low-speed control (hereinafter "low-speed control pulse"), on the outer circumferential surface of a magnetic coupling portion of a rotor case.

2. Description of the Related Art

In general, a spindle motor installed inside an optical disc drive rotates a disc so that an optical pickup mechanism can read data written to the disc.

Recently, an optical disc drive equipped with a LightScribe function has been increasingly released onto the market. Here, the LightScribe function allows users to print letters (characters) or images freely on the upper side of a disc such as a DVD, a CD or the like.

According to the related art, LightScribe discs that support the LightScribe function by having a printed encoder generating an FG pulse for low-speed control, are required in order to implement the LightScribe function. Here, typical discs for recording cannot be used in realizing the LightScribe function.

That is, in order to use the LightScribe function, a spindle motor needs to rotate at a low speed of 40 rpm to 300 rpm or less. Thus, an encoder generating a separate FG pulse is formed on the side of a disc, since the FG pulse of the spindle motor itself, which rotates at a speed of 12,000 rpm, cannot be used for the LightScribe function.

Further, an optical encoder sensor, including a light receiving part and a light emitting part, is required in order to detect signals from the encoder formed on the side of the disc. As mentioned above, the optical encoder sensor includes the light emitting part and the light receiving part. The light emitting part emits beams onto the reflective and non-reflective surfaces of the encoder formed on the disc which is in rotation. The light receiving part receives successive signals on the basis of beams reflected from the reflective and non-reflective surfaces. A controller then controls the rotational speed of the spindle motor on the basis of those successive signals received by the light receiving part.

However, the use of such LightScribe discs has limitations in that the discs are costly and are not easy to buy.

In addition, since LightScribe printing is performed on the opposite side to the read/write-side of a disc, the LightScribe disc is repetitively taken out from and put back into a chucking device. This may damage an encoder printed on the LightScribe disc.

Further, the encoder, when printed on a disc in a non-uniform manner, fails to perform precise low-speed control and impairs printing quality.

In addition, the optical encoder sensor is manufactured using a semiconductor manufacturing process, thereby increasing manufacturing costs.

SUMMARY OF THE INVENTION

An aspect of the present invention provides a motor capable of disc labeling by including a low-speed control magnet formed on the outer circumferential surface of a magnet coupling portion of a rotor case and generating a low-speed control pulse.

According to an aspect of the present invention, there is provided a motor including: a rotor case including a driving magnet formed on an inner circumferential surface thereof and providing a driving force by interacting with a coil of a stator; a low-speed control magnet formed on an outer circumferential surface of the rotor case and generating a frequency allowing for low-speed rotation enabling label printing as the rotor case rotates at a low speed; and a sensing part sensing an analog signal generated from the low-speed control magnet.

The low-speed control magnet may have a greater number of magnetized poles than the driving magnet.

The sensing part may be a magnetic sensor disposed outside of the low-speed control magnet in an outer diameter direction and detecting a magnetic signal of the low-speed control magnet.

The sensing part may be a pattern coil formed in a flexible printed circuit board and located under the low-speed control magnet in an axial direction, the pattern coil detecting a magnetic signal of the low-speed control magnet.

The analog signal received by the sensing part may be converted into a digital signal by a drive integrated circuit (drive IC), and the digital signal may be transmitted to a controller.

The analog signal received by the sensing part may be a low linear and angular speed control signal for controlling the rotation of the rotor case so as to enable disc label printing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
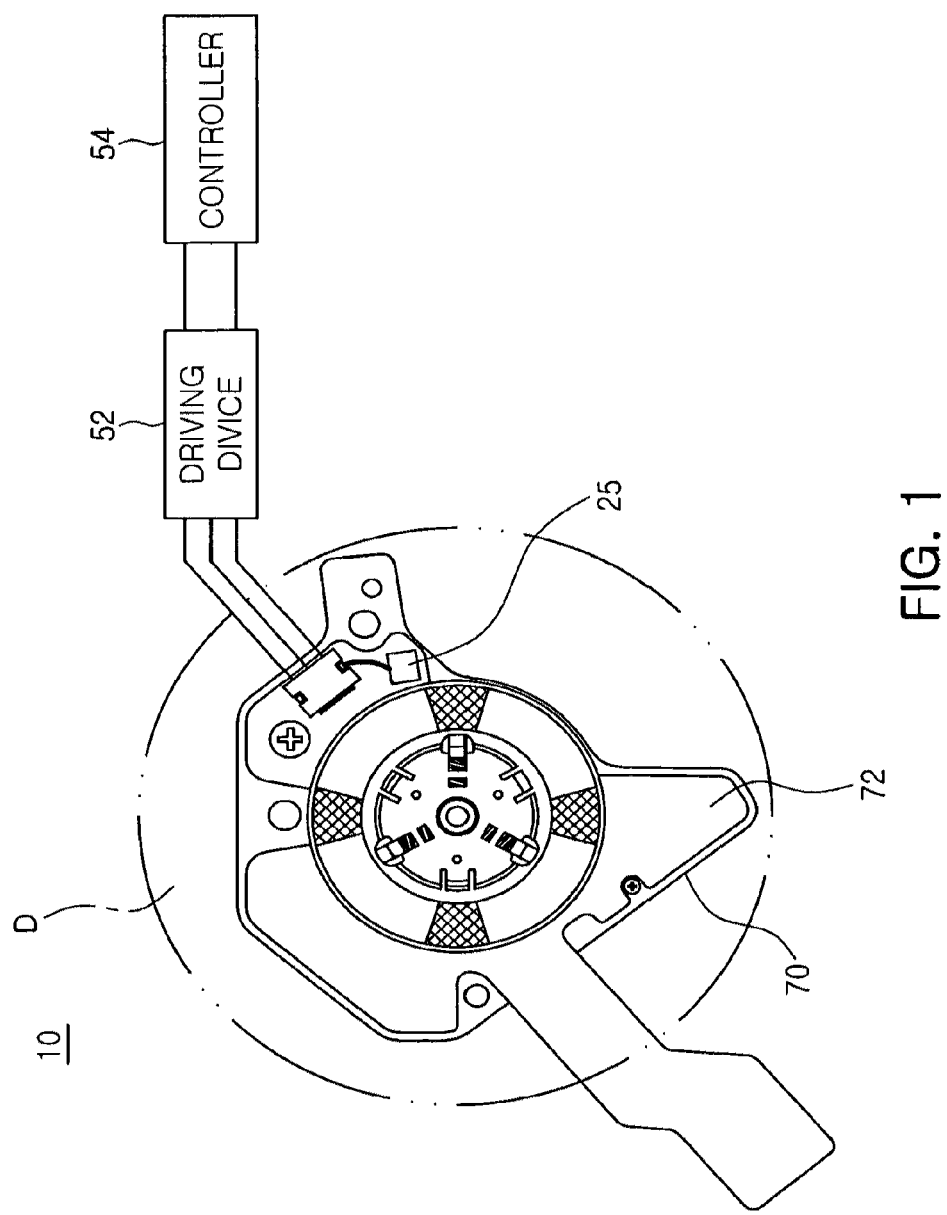
FIG. 1 is a schematic view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

The same or equivalent elements are referred to as the same reference numerals throughout the specification.

Figure 2:
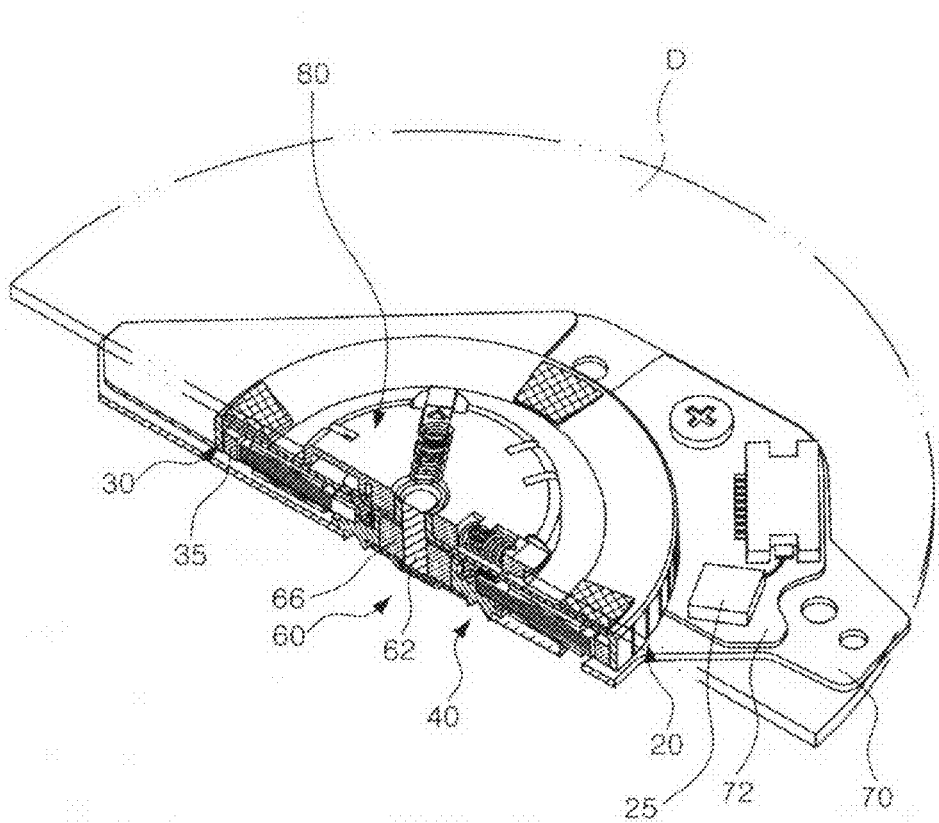
FIG. 2 is a schematic perspective view illustrating the motor according to an exemplary embodiment of the present invention.
Figure 3:
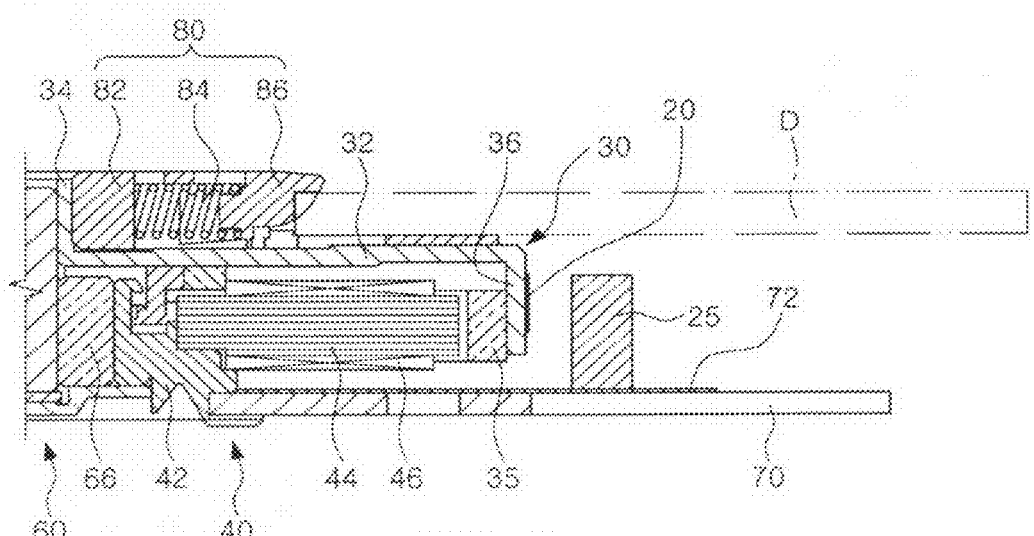
FIG. 3 is a cross-sectional view illustrating the motor according to an exemplary embodiment of the present invention.

FIG. 1 is a schematic view illustrating a motor according to an exemplary embodiment of the present invention, FIG. 2 is a schematic perspective view illustrating the motor according to an exemplary embodiment of the present invention, and FIG. 3 is a cross-sectional view illustrating the motor according to an exemplary embodiment of the present invention.

Referring to FIGS. 1 through 3, a motor 10, according to an exemplary embodiment of the present invention, may include a rotor case 32, a low-speed control magnet 20, and a sensing part.

As for the internal construction of the motor 10, the motor 10 may include a base plate 70, a rotor 30, a stator 40, a bearing assembly 60, and a chucking device 80.

The base plate 70 is a support that supports the stator 40. A flexible printed circuit board 72 may be formed on the base plate 70. A circuit pattern, applying power to the motor 10, may be formed on the flexible printed circuit board 72.

The rotor 30 includes a rotor case 32 having a cup shape. The rotor case 32 includes a ring-shaped driving magnet 35 provided on the inner circumferential portion of the rotor case 32 and corresponding to a coil 46 of the stator 40. The driving magnet 35 is a permanent magnet that generates a predetermined level of magnetic force as N poles and S poles are alternately magnetized in a circumferential direction.

The driving magnet 35 provides a driving force that rotates the motor 10 by interacting with the coil 46 of the stator 40. The driving magnet 35 also provides a driving force that rotates the rotor 30 at high speeds to read and write a disc, and a driving force that rotates the rotor 30 at low speeds for disc labeling.

The rotor case 32 includes a rotor hub 34 press-fitted to a shaft 62, and a magnet coupling portion 36 having an inner surface on which the ring-shaped magnet 35 is disposed.

The rotor hub 34 is bent in an axial direction along the upper portion of the shaft 62 in order to maintain an unmating force with the shaft 62. The chucking device 80 on which a disc is mounted is coupled with the outer surface of the rotor hub 34.

The stator 40 includes a support portion 42 supported from the outside of a sleeve 66, a plurality of cores 44 fixed to the support portion 42, and a winding coil 46 wound around the cores 44.

The driving magnet 35, provided on the inner surface of the magnet coupling portion 36, opposes the winding coil 46. The rotor 30 is rotated by the electromagnetic interaction between the driving magnet 35 and the winding coil 46.

Further, the bearing assembly 60 is disposed inside the support portion 42 of the stator 40, and includes the shaft 62 supporting the rotation of the rotor 30, and the sleeve 66 in which the shaft 60 is rotatably installed.

Terms regarding directions are defined as follows: the axial direction refers to a vertical direction with reference to the shaft 62 in FIG. 1, and outer and inner diameter directions refer to a direction toward the outer edge of the rotor 20 from the shaft 62, and a direction toward the center of shaft 62 from the outer edge of the rotor 30, respectively.

The chucking device 80 is coupled and fixed to one end portion of the rotor hub 34, and allows for the detachable mounting of a disc thereon. The chucking device 80 includes a chuck base 82, a spring 84, and a chuck chip 86.

A center hole is formed in the center of the chuck base 82. The one end portion of the rotor hub 34 may be inserted in the center hole and coupled with the motor 10.

The chuck chip 86 is received in the chuck base 82, and may protrude toward the outside of the chuck base 82. The spring 84 may be provided to elastically support the chuck chip 82 in an outward direction of the chuck base 82, thereby allowing the chuck chip 82 to protrude to the outside of the chuck base 82.

The low-speed control magnet 20 may be formed on the outer circumferential surface of the rotor case 32. Notably, the low-speed control magnet 20 may be disposed on the outer circumferential surface of the magnet coupling portion 36 of the rotor case 32. The low-speed control magnet 20 may generate frequencies for low-speed rotation in order to enable label printing as the rotor case 32 rotates at low speeds.

The sensing part serves as a data detection device that receives information regarding disc (D) rotation. Notably, the sensing part may detect information regarding the speed of the rotor case 32 by receiving a magnetic signal from the low-speed control magnet 20 placed on the outer circumferential surface of the rotor case 32.

In this case, the low-speed control magnet 20 is formed by magnetizing 300 or more poles for the purpose of low-speed rotation control. N and S signals generated by the low-speed control magnet 20 are transmitted to the sensing part, so that the sensing part can detect the rotation speed of the motor 10.

The low-speed control magnet 20 has a greater number of magnetized poles than the driving magnet 35.

Here, the N and S signals are analog signals, not digital signals typically received by an encoder according to the related art. The analog signals are combined into digital signals by a driving device (i.e., a Drive IC) 52, and transmitted to a controller 54.

The analog signal received by the sensing part may be a control signal for low linear and angular speeds (i.e., a low-linear and angular speed control signal), which controls the rotation of the rotor case so as to enable disc label printing.

The sensing part according to this exemplary embodiment may be a magnetic sensor 25 disposed outside of the low-speed control magnet 20 in the outer diameter direction in order to detect the magnetic signal of the low-speed control magnet 20.

Figure 4:
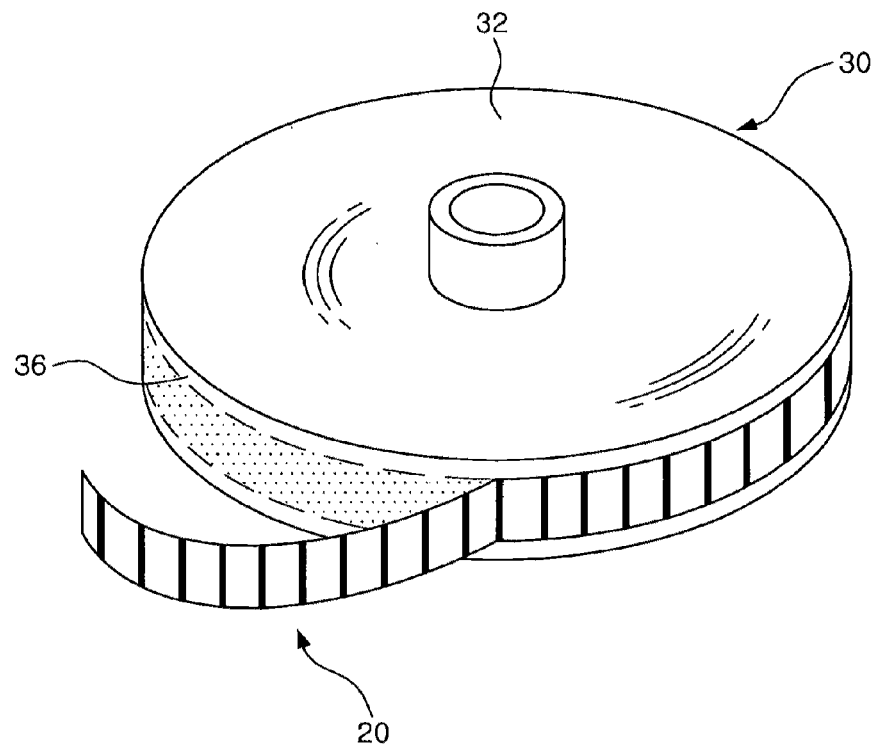
FIG. 4 is a schematic perspective view illustrating how a magnetic strip is bonded with the outer circumferential surface of a magnet coupling portion of a rotor case of the motor.

FIG. 4 is a schematic perspective view illustrating how a magnetic strip is bonded to the outer circumferential surface of the magnet coupling portion of the rotor case of the motor.

Referring to FIG. 4, it can be seen that the low-speed control magnet 20 is formed by bonding a film-type magnetic strip 20 onto the outer circumferential surface of the magnet coupling portion 36 of the rotor case 32.

However, the present invention is not limited to the bonding the film type magnetic strip 20, and the above-described structure may be easily changed, provided that a magnet can be attached to the outer circumferential surface of the rotor case 32.

Figure 5:
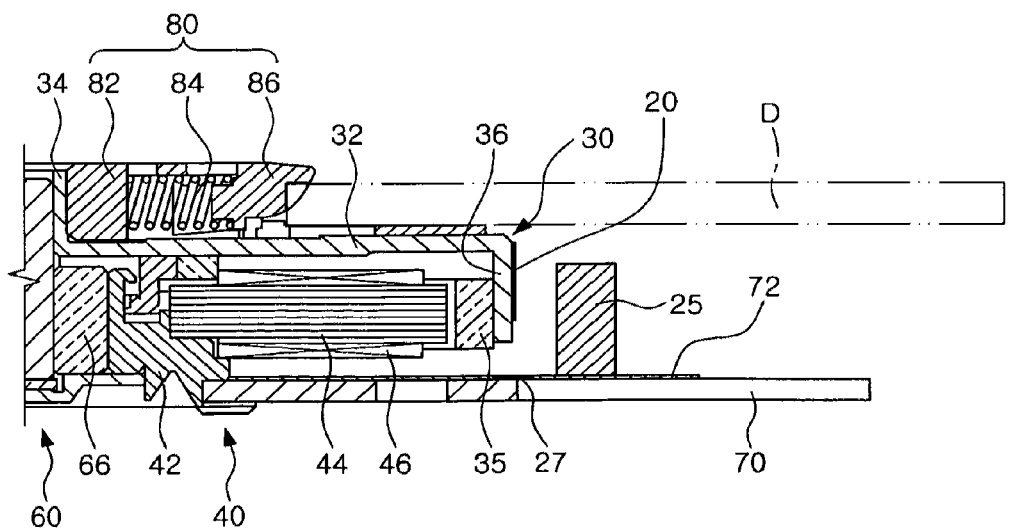
FIG. 5 is a cross-sectional view illustrating a motor according to another exemplary embodiment of the present invention.
Figure 6:
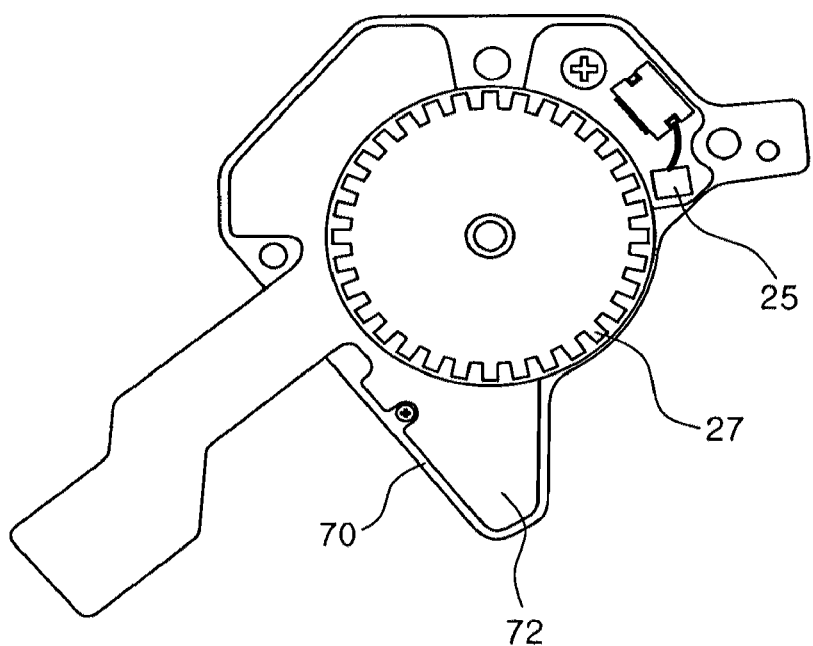
FIG. 6 is a schematic plan view illustrating how a pattern coil, depicted in FIG. 5, is formed on a flexible circuit board.

FIG. 5 is a cross-sectional view illustrating a motor according to another exemplary embodiment of the present invention. FIG. 6 is a schematic plan view illustrating how a pattern coil depicted in FIG. 5 is formed on a flexible circuit board.

Referring to FIGS. 5 and 6, the sensing part may be a pattern coil 27 formed in the flexible printed circuit board 72 and located under the low-speed control magnet 20 in the axial direction. This pattern coil 27 serves to detect the magnetic signal of the low-speed control magnet 20.

The pattern coil 27 may be embedded in the flexible printed circuit board 72 in the form of patterns. Also, the pattern coil 27 may receive the magnetic signal of the low-speed control magnet 20 and transmit the signal to a driving device.

Other constructions of the motor, according to this exemplary embodiment depicted in FIG. 5, are substituted with the description regarding FIGS. 3 and 4.

The motor, according to the present invention, eliminates the need for a LightScribe disc, and is capable of low-speed control required in executing the LightScribe function even when a typical recording disc is used.

In addition, since an encoder is not formed on a disc, damage to the encoder, caused by scratches or foreign substances, does not occur, thereby ensuring precise low-speed control.

Further, the magnetic sensor, recognizing an analog signal, is used without adopting an optical encoder sensor, so that the manufacturing costs of the motor can be reduced.

As set forth above, according to the motor according to exemplary embodiments of the invention, a LightScribe disc may not be used, and low-speed control for the LightScribe function is ensured even for a typical disc for recording.

The absence of an encoder from a disc obviates the damage to the encoder due to scratches or foreign substances. This allows for precise low-speed control.

In addition, since a magnetic sensor, which recognizes an analog signal, is used instead of an optical encoder sensor, the manufacturing costs of a motor can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
    a rotor case including a driving magnet formed on an inner circumferential surface thereof and providing a driving force by interacting with a coil of a stator;
    a low-speed control magnet formed on an outer circumferential surface of the rotor case and generating a frequency allowing for low-speed rotation enabling label printing as the rotor case rotates at a low speed; and
    a sensing part sensing an analog signal generated from the low-speed control magnet,
    wherein the low-speed control magnet has a greater number of magnetized poles than the driving magnet.

2. The motor of claim 1, wherein the sensing part is a magnetic sensor disposed outside of the low-speed control magnet in an outer diameter direction and detecting a magnetic signal of the low-speed control magnet.

3. The motor of claim 1, wherein the sensing part is a pattern coil formed in a flexible printed circuit board and located under the low-speed control magnet in an axial direction, the pattern coil detecting a magnetic signal of the low-speed control magnet.

4. The motor of claim 1, wherein the analog signal received by the sensing part is converted into a digital signal by a drive integrated circuit (drive IC), and the digital signal is transmitted to a controller.

5. The motor of claim 1, wherein the analog signal received by the sensing part is a low linear and angular speed control signal for controlling the rotation of the rotor case so as to enable disc label printing.

* * * * *